(12) United States Patent
Jie et al.

(10) Patent No.: US 11,225,246 B2
(45) Date of Patent: Jan. 18, 2022

(54) VEHICLE CONTROL METHOD AND APPARATUS, AND STORAGE MEDIUM

(71) Applicant: TENCENT TECHNOLOGY (SHENZHEN) COMPANY LIMITED, Shenzhen (CN)

(72) Inventors: Zongchang Jie, Shenzhen (CN); Menglin Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 380 days.

(21) Appl. No.: 16/436,589

(22) Filed: Jun. 10, 2019

(65) Prior Publication Data

US 2019/0308616 A1  Oct. 10, 2019

Related U.S. Application Data

(63) Continuation of application No. PCT/CN2018/079149, filed on Mar. 15, 2018.

(30) Foreign Application Priority Data

Mar. 21, 2017 (CN) .......................... 201710168826.2

(51) Int. Cl.
*B60W 30/06* (2006.01)
*B60W 10/06* (2006.01)
(Continued)

(52) U.S. Cl.
CPC ............ *B60W 30/06* (2013.01); *B60W 10/06* (2013.01); *B60W 50/0097* (2013.01);
(Continued)

(58) Field of Classification Search
CPC .............. B60W 10/06; B60W 50/0097; G06K 9/00791
(Continued)

(56) References Cited

U.S. PATENT DOCUMENTS 8,948,990 B2 * 2/2015 Kobayashi ........... B60K 26/021
701/70
10,042,359 B1 * 8/2018 Konrardy .................. B60P 3/12
(Continued)

FOREIGN PATENT DOCUMENTS

| CN | 101412401 A | 4/2009 |
|---|---|---|
| CN | 103700277 A | 4/2014 |

(Continued)

OTHER PUBLICATIONS

Japanese Office Action dated Oct. 26, 2020 in Japanese Application No. 2019-549464, with English translation, 9 pgs.
(Continued)

*Primary Examiner* — Peter D Nolan
*Assistant Examiner* — Luke Huynh
(74) *Attorney, Agent, or Firm* — Oblon, McClelland, Maier & Neustadt, L.L.P.

(57) ABSTRACT

A vehicle control method can include enabling a temporary parking mode of a first vehicle parked at a first temporary parking location, in which a first detection sensor of the first vehicle is in an enabled mode. A trigger feature within a preset range of the first vehicle can be detected based on the first detection sensor. The trigger feature can indicate occurrence of an event associated with a second vehicle or a human appears within the preset range. The first vehicle can be moved to a second parking location in the parking area.

18 Claims, 6 Drawing Sheets

(51) Int. Cl.
    *B60W 50/00*     (2006.01)
    *G06K 9/00*     (2006.01)
    *G08G 1/14*     (2006.01)

(52) U.S. Cl.
    CPC .......... *G06K 9/00791* (2013.01); *G08G 1/14* (2013.01); *B60W 2400/00* (2013.01); *B60W 2420/42* (2013.01); *B60W 2554/00* (2020.02)

(58) Field of Classification Search
    USPC ......................................................... 701/25
    See application file for complete search history.

(56) References Cited

U.S. PATENT DOCUMENTS

| | | |
|---|---|---|
| 2004/0252034 A1 | 12/2004 | Slemmer et al. |
| 2013/0315443 A1 | 11/2013 | Kim |
| 2015/0039173 A1* | 2/2015 | Beaurepaire ....... B62D 15/0285 701/23 |
| 2015/0039211 A1 | 2/2015 | Stefan et al. |
| 2015/0039213 A1* | 2/2015 | Stefan ................ B62D 15/0285 701/117 |
| 2015/0149022 A1 | 5/2015 | Harvey |
| 2016/0077525 A1* | 3/2016 | Tomozawa ............. B62D 6/002 701/25 |
| 2016/0155331 A1 | 6/2016 | Mielenz |
| 2016/0193996 A1* | 7/2016 | Stefan .................. B60W 40/02 701/25 |
| 2016/0284217 A1 | 9/2016 | Lee et al. |
| 2017/0028989 A1 | 2/2017 | Thillainatesan et al. |
| 2017/0088130 A1* | 3/2017 | Suzuki .................. G08G 1/168 |

FOREIGN PATENT DOCUMENTS

| | | |
|---|---|---|
| CN | 103778795 A | 5/2014 |
| CN | 104057950 A | 9/2014 |
| CN | 104691544 A | 6/2015 |
| CN | 104742881 A | 7/2015 |
| CN | 105869098 A | 8/2016 |
| CN | 106043282 A | 10/2016 |
| CN | 106043305 A | 10/2016 |
| CN | 106274898 A | 1/2017 |
| CN | 106414201 A | 2/2017 |
| CN | 108010373 A | 5/2018 |
| DE | 10 2014 001554 A1 | 8/2015 |
| DE | 10 2014 224454 A1 | 6/2016 |
| DE | 102015212581 A1 | 1/2017 |
| EP | 3 088 730 A1 | 11/2016 |
| JP | 64-37661 | 2/1989 |
| JP | 2000 149198 | 5/2000 |
| JP | 2008-2999415 | 12/2008 |
| JP | 2011016401 A | 1/2011 |
| JP | 2012-137999 | 7/2012 |
| JP | 2013-177128 | 9/2013 |
| JP | 2016-126607 | 7/2016 |
| JP | 2016-141161 | 8/2016 |
| JP | 2016-173637 | 9/2016 |
| JP | 2016-184200 | 10/2016 |
| KR | 10-1610526 | 4/2016 |
| KR | 10-2016-0114486 | 10/2016 |

OTHER PUBLICATIONS

Written Opinion and International Search Report dated Jun. 11, 2018 in PCT/CN2018/079149 with concise English translation.
Chinese Office Application dated May 13, 2019 in Chinese Application No. 201710168826.2 with partial English translation.
Chinese Office Action dated Sep. 29, 2020 in Chinese Application No. 201911275678.X, with English translation, 10 pgs.
Korean Office Action dated May 26, 2020 in Korean Application No. 10-2019-7018151, with English translation, 12 pgs.
European Office Action dated Feb. 28, 2020 in European Application No. 18770324.4, 1 pg.
European Extended Search Report dated Feb. 11, 2020, in European Application No. 18770324.4, 9 pgs.
Indian Office Action dated Jan. 26, 2021 in Indian Application No. 201947024038, 7 pgs.

* cited by examiner

VEHICLE CONTROL METHOD AND APPARATUS, AND STORAGE MEDIUM

RELATED APPLICATION

This application is a continuation of International Application No. PCT/CN2018/079149, filed on Mar. 15, 2018, which claims priority to Chinese Patent Application No. 201710168826.2, filed on Mar. 21, 2017. The entire disclosures of the prior applications are incorporated herein by reference in their entirety.

FIELD OF THE TECHNOLOGY

This application relates to the field of vehicle control technologies.

BACKGROUND OF THE DISCLOSURE

In daily life, there is a general case that vehicle parking spaces in a parking lot or a parking garage are not sufficient for use. In this case, a driver may temporarily park a vehicle near a vehicle parking lot and wait for an available parking space. While waiting, the driver cannot predict a waiting time, and therefore, the drivers can only leave the vehicle after parking the vehicle in a temporary non-parking space. However, while parked at a temporary place, the vehicle may block some vehicles from driving away to/from or passing through the vehicle parking place.

SUMMARY

A vehicle control method can include enabling a temporary parking mode of a first vehicle parked at a first temporary parking location, in which a first detection sensor of the first vehicle is in an enabled mode. A trigger feature within a preset range of the first vehicle can be detected based on the first detection sensor. The trigger feature can indicate occurrence of an event associated with a second vehicle or a human appears within the preset range. The first vehicle can be moved to a second parking location in the parking area.

A vehicle control apparatus can include processing circuitry configured to enable a temporary parking mode of a first vehicle parked at a first temporary parking location, in which a first detection sensor of the first vehicle is in an enabled mode. The processing circuitry can further be configured to detect a trigger feature within a preset range of the first vehicle based on the first detection sensor. The trigger feature can indicate occurrence of an event associated with a second vehicle or a human appears within the preset range. The first vehicle can be moved to a second parking location in the parking area.

A non-transitory computer-readable medium can include a program executable by a processor to perform the vehicle control method.

BRIEF DESCRIPTION OF THE DRAWINGS

To describe the technical solutions in the embodiments of this application, the following briefly introduces the accompanying drawings for describing the embodiments. The accompanying drawings in the following description show merely some embodiments of this application, and a person of ordinary skill in the art may still derive other drawings from the accompanying drawings.

DESCRIPTION OF EMBODIMENTS

The following describes technical solutions in embodiments of this disclosure with reference to the accompanying drawing. The described embodiments are some embodiments of this disclosure rather than all of the embodiments. All other embodiments obtained by a person of ordinary skill in the art based on the embodiments of this disclosure shall fall within the protection scope of this disclosure.

Figure 1A:
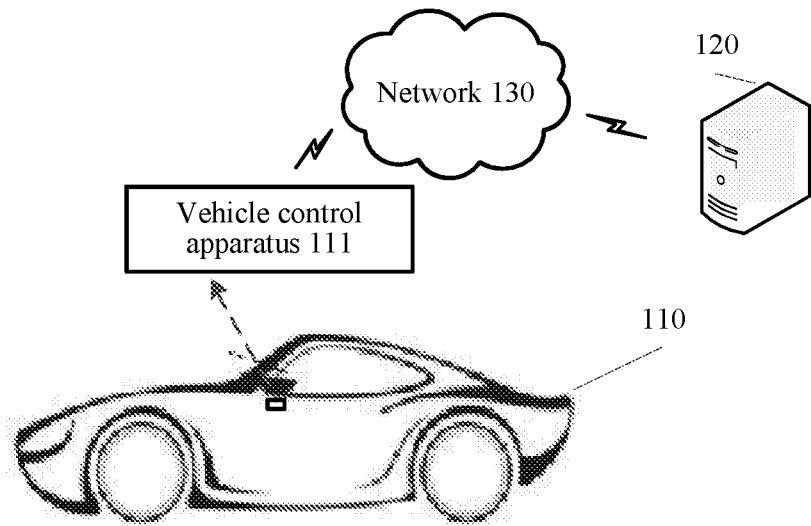
FIG. 1A is a schematic diagram of an application scenario according to some embodiments of this disclosure.

FIG. 1A is a schematic diagram of an application scenario according to some embodiments of this disclosure. As shown in FIG. 1A, a vehicle 110 in the application scenario may include a vehicle control apparatus 111. The vehicle control apparatus 111 may be various in-vehicle devices such as a computer (e.g., trip computer) built in the vehicle 110 or a detachable mobile device. This is not limited in this disclosure. The vehicle control apparatus 111 may communicate with a server 120 via a network 130. For example, the vehicle control apparatus 111 may obtain content such as route planning information from the server 120.

Figure 1B:
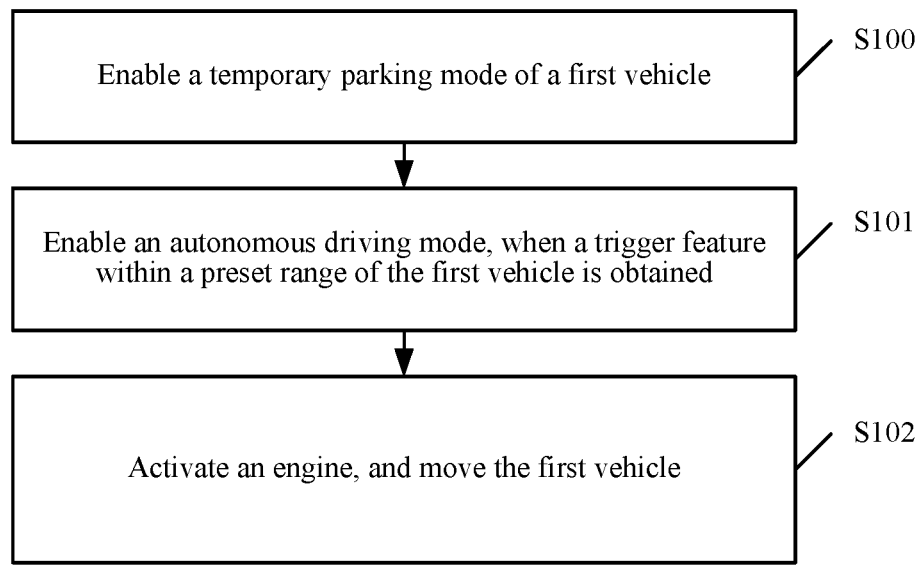
FIG. 1B is a flowchart of a vehicle control method according to an embodiment of this disclosure.

The following describes a vehicle control method provided in embodiments of this disclosure with reference to FIG. 1B.

FIG. 1B is a flowchart of the vehicle control method according to an embodiment of this disclosure. The method shown in FIG. 1B may be performed, for example, in the vehicle control apparatus 111. The method may include the following steps:

In step S100, a temporary parking mode of a first vehicle is enabled. In the temporary parking mode, in an embodiment, an engine of the first vehicle is in a sleep mode, and a detection sensor of the first vehicle is in an enabled mode, to detect whether there is a trigger feature within a preset range of the first vehicle. The trigger feature can be used to trigger an autonomous driving mode of the first vehicle. In another embodiment, the engine of the first vehicle may be in an active mode instead of the sleep mode.

The first vehicle may be any vehicle, such as motor vehicles (motorcycles, cars, trucks, buses), railed vehicles (trains, trams), watercraft (ships, boats), amphibious vehicles (screw-propelled vehicle, hovercraft), aircraft (airplanes, helicopters) and spacecraft, and the like. When the first vehicle stops, and a driver leaves the first vehicle, the temporary parking mode of the first vehicle may be enabled. When the first vehicle parks at a first temporary parking place, for example, in a parking area, such as a parking lot, a parking garage, or on a city street, or the like, the temporary parking mode of the first vehicle may be enabled. Located at a temporary parking place, the first vehicle may block other vehicles. The first vehicle may flexibly switch between the temporary parking mode and the autonomous driving mode, to resolve this problem.

In the temporary parking mode, the engine of the first vehicle is in the sleep mode or the active mode, and the detection sensor of the first vehicle is in the enabled mode. The detection sensor includes but is not limited to an infrared sensor, radar, and a camera.

In an embodiment, the first vehicle stops at the first temporary parking place in the parking lot. The parking lot may be an open ground parking lot. When vehicle parking spaces (or places) in the open ground parking lot are not sufficient for use, the first vehicle may temporarily park near an occupied vehicle parking space (that is, a temporary parking place or location in an embodiment of this disclosure), to wait for a parking space to become available. In an embodiment, the first vehicle stops at the first temporary parking place in the parking lot. Since the first vehicle parks for a short period of time, the first vehicle may temporarily park at the first temporary parking place. This is convenient for the first vehicle to move in and out, and can avoid that the first vehicle parks at a vehicle parking place and cannot move out of the vehicle parking place.

When the first vehicle parks at the first temporary parking place, for example, after a driver leaves the first vehicle, the first vehicle enables the temporary parking mode. In the temporary parking mode, to ensure an endurance power capability and reduce power consumption of the first vehicle, the engine of the first vehicle can turn into the sleep mode. The detection sensor (for example, the infrared sensor) and the like can be enabled.

In step S101, an autonomous driving mode of the first vehicle is enabled, when a trigger feature within a preset range of the first vehicle is obtained by using the detection sensor. For example, the autonomous driving mode may be enabled by enabling an autonomous driving system.

The trigger feature may include, for example at least one of the following features:

a startup of a second vehicle within the preset range;

a running (or moving) of the second vehicle that is approaching the first vehicle within the preset range; and a flashing light of the second vehicle within the preset range.

It should be noted that, the second vehicle can be any vehicle other than the first vehicle.

Accordingly, in one embodiment of this disclosure, the first vehicle enables the temporary parking mode, and detects, by using the detection sensor of the first vehicle, whether there is the trigger feature within the preset range of the first vehicle. The preset range may be a maximum range that can be detected by the detection sensor in an embodiment, or may be a preset distance in another embodiment.

In some embodiments, the trigger feature may include but is not limited to: the startup feature of the second vehicle within the preset range around the first vehicle, the running feature of the second vehicle, the flash feature of the second vehicle, and a feature of a person (e.g., biometric feature, or biological feature). The following describes a detection manner of each of the above-described trigger features as an example.

In an embodiment, a manner of detecting the startup feature of the second vehicle within the preset range of the first vehicle may be: detecting an energy change (e.g., a temperature change, an infrared light intensity change, etc.) within the preset range by using the infrared sensor of the first vehicle. When the engine of the vehicle is started up, a given amount of energy is radiated. When the infrared sensor of the first vehicle detects the energy change, it can be determined that there is the startup feature of the second vehicle. In another embodiment, a manner of detecting the startup feature of the second vehicle within the preset range of the first vehicle may be: detecting, by the first vehicle, the startup feature of the second vehicle by using a sound detection sensor. For example, if detecting a startup sound feature of an automobile, the sound detection sensor determines that there is the startup feature of the second vehicle.

In an embodiment, a manner of detecting the running (or moving) feature of the second vehicle that is approaching the first vehicle within the first vehicle of the preset range may be: detecting, by using the radar and the camera of the first vehicle, whether there is the running feature of the second vehicle that is approaching the first vehicle within the preset range. For example, the first vehicle detects, by using the radar, that there is an obstacle that is approaching the first vehicle. Further, the first vehicle captures an image in real time by using the camera and analyzes the image, to learn that the obstacle is a vehicle.

In an embodiment, to detect the trigger feature, the first vehicle may activate detection sensors by levels (e.g., the sensors may have different capabilities and power consuming levels, and can be activated successively to save energy). For example, the trigger feature may be but is not limited to, the running feature (e.g., movement) of the second vehicle, or a feature of a person (e.g., a biometric or biological feature), that is approaching the first vehicle within the preset range. Specifically, the plurality of detection sensors in this application may include a first detection sensor and a second detection sensor. The first detection sensor may include, for example, one or more of an infrared sensor, a radar sensor, a sound sensor, and a light sensor. The second sensor may include but is not limited to, a camera. When the first vehicle is in the temporary parking mode, in step S100, the first detection sensor may be enabled first. In other words, the second detection sensor is disabled in step S100. In this way, in step S101, whether an object approaches the first vehicle can be detected by using the first detection sensor. When it is detected that an object approaches the first vehicle, in step S101, the second detection sensor may be enabled. In this way, in step S101, whether the object is a vehicle or a person can be determined by using the second detection sensor. In other words, in step S101, whether there is the running feature of the second vehicle or the feature of a person that is approaching within the preset range is determined by using the second detection sensor. The autonomous driving mode of the first vehicle is enabled, when it is determined that the running feature or the feature of a person meets the trigger feature. In conclusion, according to the manner of enabling the detection sensors by levels in step S101, power consumption (for example, electric energy) of the first vehicle can be reduced.

A manner for detecting the light flashing feature of the second vehicle within the preset range may be: acquiring image information of a current environment in real time by using the camera of the first vehicle, and analyzing the image information, to obtain the flash feature of the second vehicle within the preset range. In an embodiment, the flash feature may be used to describe a flash mode of the second vehicle. The flash mode may include, for example, a double flash, a left turn flash, and a right turn flash. In this case, the first vehicle may predict a moving path of the second vehicle according to the flash mode. In this case, the first vehicle may perform avoidance according to the predicted moving path. For example, the first vehicle may move in advance according to the predicted moving path.

It should be noted that, the detection sensor may include but is not limited to the sensors described in the foregoing examples.

The trigger feature is used to trigger the autonomous driving mode of the first vehicle. For example, in the autonomous driving mode, the engine of the first vehicle can be in an activated mode. The first vehicle in the autonomous driving mode may, based on a coordination of a global positioning system, artificial intelligence, visual computing, radar, and a monitoring apparatus, autonomously and safely operate without any active operation performed by a person.

In an embodiment, the autonomous driving mode may be an L4 fully autonomous driving mode. L4 represents the 4th level of the classification of autonomous driving technologies by the New Car Assessment Program (NHTSA) and the Society of Automotive Engineers (SAE). At this level, a vehicle completes all driving operations by using an autonomous driving system, and the fully autonomous driving can be applicable to all roads and environmental conditions.

When the detection sensor of the first vehicle detects the trigger feature, the first vehicle may switch from the temporary parking mode to the autonomous driving mode.

In step S102, the engine is activated and the first vehicle moves in the autonomous driving mode. In an embodiment, if the detection sensor detects that there is the trigger feature within the preset range of the first vehicle, in step S102, the autonomous driving mode of the first vehicle may be enabled. For example, when it is detected that another second vehicle approaches or the second vehicle is started up, the autonomous driving mode is entered. In another example, when it is detected that another second vehicle's light flashes, the autonomous driving mode is entered. In some examples, the engine may be in active mode when in the temporary parking mode. Accordingly, at step S102 no operation of activating the engine is performed.

In an embodiment, the first vehicle may further detect, for example, by using the infrared sensor, whether a living creature (an animal or a human being) is approaching. When it is detected that a living creature is approaching, the camera is enabled to identify the approaching object. If a person is approaching (for example, a human face feature is detected), prompt information can be output by using a voice, displaying a message, providing a signal, and the like. The prompt information is used to inform the person that the first vehicle may move, however, a flash indication of another vehicle, or a detectable movement of another vehicle, is required. Or in other words, the prompt information may indicate the first vehicle can move away in reaction to an approaching vehicle or a light signal of a vehicle. In this way, if the person needs to drive by the first vehicle, the person may instruct the first vehicle to move away by using a flashing light of the vehicle. Further, when the camera of the first vehicle detects that the user enters an automobile, the first vehicle may autonomously enter the autonomous driving mode, or the first vehicle waits for a flash indication of the another vehicle, and then enters the autonomous driving mode.

The first vehicle enables the autonomous driving mode, and moves the first vehicle while in the autonomous driving mode. For example, when the first vehicle detects that another second vehicle is approaching or another second vehicle is started up around, the first vehicle may enter the autonomous driving mode if needed. The first vehicle may invoke, by using the autonomous driving system, the camera to scan an on-site environment, for example, capture an image in real time by using the camera, perform image analysis on the captured image, and determine whether the first vehicle blocks a driving path of the second vehicle which is, for example, on the opposite side. For example, the first vehicle may invoke the radar to measure a width of a vacant place around the first vehicle, and determine, according to a width of the second vehicle and the width of the vacant place around the first vehicle, whether the first vehicle blocks the driving path of the second vehicle.

If the first vehicle blocks the driving path of the second vehicle, the first vehicle may activate the engine and move to search for another temporary parking place or to search for a vacant vehicle parking space in an embodiment. If it is detected that the first vehicle does not block the driving path of the second vehicle which is on the opposite side, in an embodiment, the first vehicle may move to perform avoidance according to a flash feature of the second vehicle which is on the opposite side, until the second vehicle which is on the opposite side is away from the preset range that can be perceived by the first vehicle. In an embodiment, if it is detected that the first vehicle does not block the driving path of the second vehicle, the first vehicle may not move, and may not turn on the engine.

Further, within a period of time afterwards (for example, 10 s or 20 s), if it is detected that another vehicle or living creature moves out of the preset range, the temporary parking mode is entered again. In the temporary parking mode, the first vehicle can enable the detection sensor, and the engine of the first vehicle can be in the sleep mode. In this way, power consumption of the first vehicle can be reduced.

In an embodiment, the first vehicle moves to a temporary parking place in a parking lot. Before the first vehicle enters, or re-enters the temporary parking mode, the first vehicle may detect, by using the camera, whether there is a vacant vehicle parking place within the preset range. Alternatively, while leaving the original temporary parking place, the first vehicle may search for a vacant vehicle parking place.

For example, the first vehicle captures an image of the preset range of the first vehicle by using the camera, and analyzes the image, to determine whether there is a feature of a vacant vehicle parking place in the image. For example, the feature of the vacant vehicle parking place is a rectangular box formed by lines. For example, the first vehicle may monitor an exit of the parking area to determine whether a vehicle has left the parking area. For example, the first vehicle may capture an image of the exit of the parking area. By analyzing the image, the first vehicle may determine if a vehicle has left the parking area. Alternatively, the vehicle may communicate with a parking system to obtain knowledge of available spaces in the parking lot. In another example, the vehicle may use a location monitoring device to obtain locations of vehicles to determine if one of the vehicles has left the parking lot.

If there is a vacant vehicle parking place, the first vehicle may autonomously plan a path for driving into the vacant vehicle parking space, and drive into the vacant vehicle parking space by using the path. After the first vehicle drives into a normal vehicle parking space, an entire parking process is complete. In this case, the vehicle control apparatus 111 may send a final parking place to the driver of the first vehicle, for example, by using the autonomous driving system.

In the dynamic parking process, if an abnormal condition takes place, such as a collision with a motor vehicle or a living creature, the autonomous driving system may send alarm information to the target user for emergency handling.

For example, according to the process shown in FIG. 1B, a vehicle can autonomously switch between a temporary parking mode and an autonomous driving mode, so that not only movement of the vehicle can be autonomously controlled, but also power consumption can be reduced.

Figure 2:
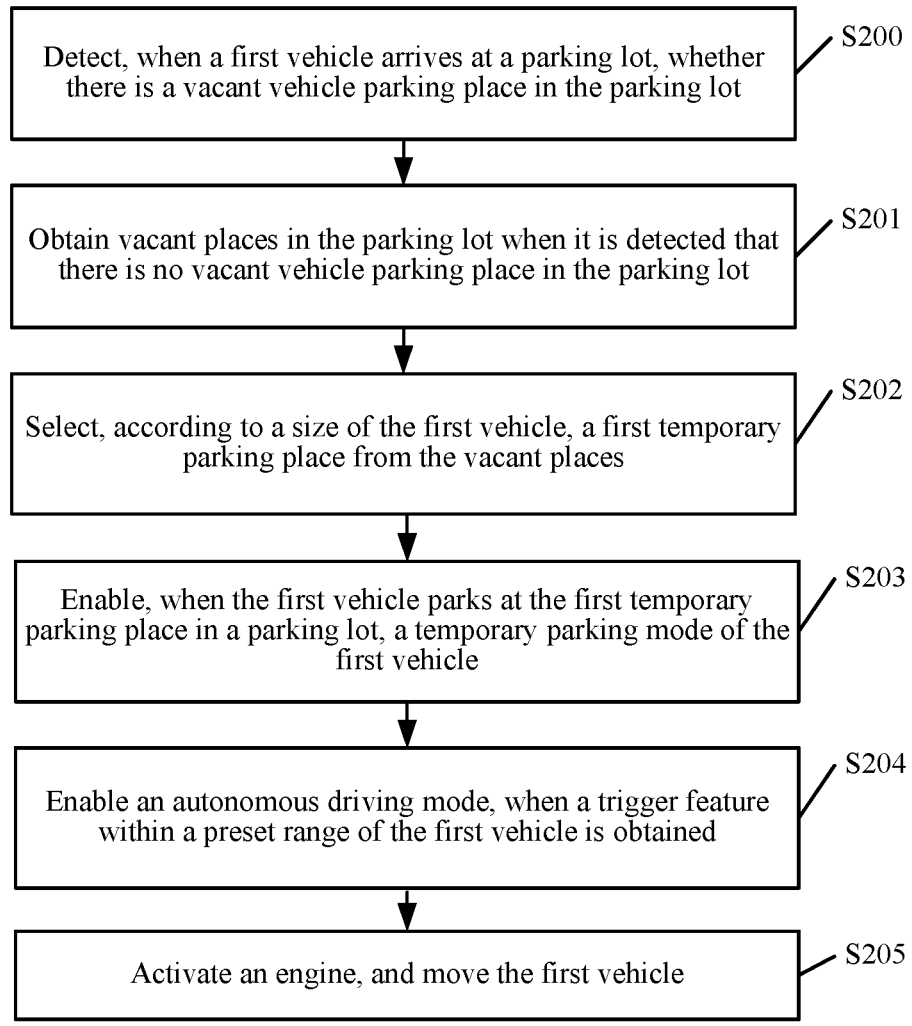
FIG. 2 is a flowchart of another vehicle control method according to an embodiment of this disclosure.

FIG. 2 is a flowchart of another vehicle control method according to an embodiment of this disclosure. The method shown in FIG. 2 may be performed, for example, in a vehicle control apparatus 111. As shown in FIG. 2, the vehicle control method provided in this embodiment of this disclosure includes the following steps:

In step S200, when a first vehicle arrives at a parking lot, whether there is a vacant vehicle parking space (or place) in the parking lot is detected.

In this embodiment of this disclosure, the parking lot may be an open ground parking lot. After arriving at the open ground parking lot, the first vehicle detects a current environment, for example, by using a camera on the first vehicle, and determines whether there is a vacant vehicle parking space. For example, the first vehicle may capture an image of the current environment by using the camera, analyze the image of the current environment, and determine whether there is a feature of a vacant vehicle parking space in the current environment. For example, the feature of the vacant vehicle parking space includes a shape feature of a vehicle parking space that is planned in advance, for example, a rectangular box planned with white lines. If there is the feature of the vacant vehicle parking space, it is determined that there is the vacant vehicle parking space. Further, whether there is an obstacle in the vacant vehicle parking space may be detected, for example, by using radar on the first vehicle.

In step S201, vacant places in the parking lot are obtained, if there is no vacant vehicle parking space in the parking lot.

In step S202, a first temporary parking place is selected, according to a size of the first vehicle, from the vacant places for parking.

If the first vehicle detects that there is no vacant vehicle parking place in the parking lot (e.g., there is no feature of a vacant vehicle parking space in the current environment), The first vehicle obtains at least one vacant place in the parking lot by analyzing the image of the current environment that is captured by using the camera. The vacant place may be a location other than a vehicle parking space in the parking lot.

Further, the first vehicle may determine a size of the vacant place by using the radar or the camera, for example, by analyzing an image of the vacant place that is captured by using the camera. In an embodiment, the first vehicle may select, according to the size of the first vehicle (for example, a length and a width of the first vehicle), the first temporary parking place from the at least one vacant place that is found. A criterion for selecting the first temporary parking place may be that, after the first vehicle parks at the first temporary parking place, another vehicle can still pass by the first vehicle. That is, a sufficiently wide spacing that has a width, for example, greater than a preset threshold, is reserved between the first vehicle and another parking vehicle.

In step S203, a temporary parking mode of the first vehicle is enabled when the first vehicle parks at the first temporary parking place in the parking lot. In the temporary parking mode, an engine of the first vehicle can be in a sleep mode, and a detection sensor of the first vehicle can be in an enabled mode.

In step S204, an autonomous driving mode of the first vehicle is enabled, when a trigger feature within a preset range of the first vehicle is obtained by using the detection sensor.

In step S205, the engine is activated and the first vehicle is moved in the autonomous driving mode.

For an exemplary description of steps S203 to S205 in this embodiment of this disclosure, refer to steps S100 to S102 in the embodiment of FIG. 1B, and details are not described herein again.

According to the method shown in FIG. 2, a vehicle can autonomously switch between a temporary parking mode and an autonomous driving mode, and not only driving of the vehicle can be autonomously controlled, but also power consumption can be reduced.

Figure 3:
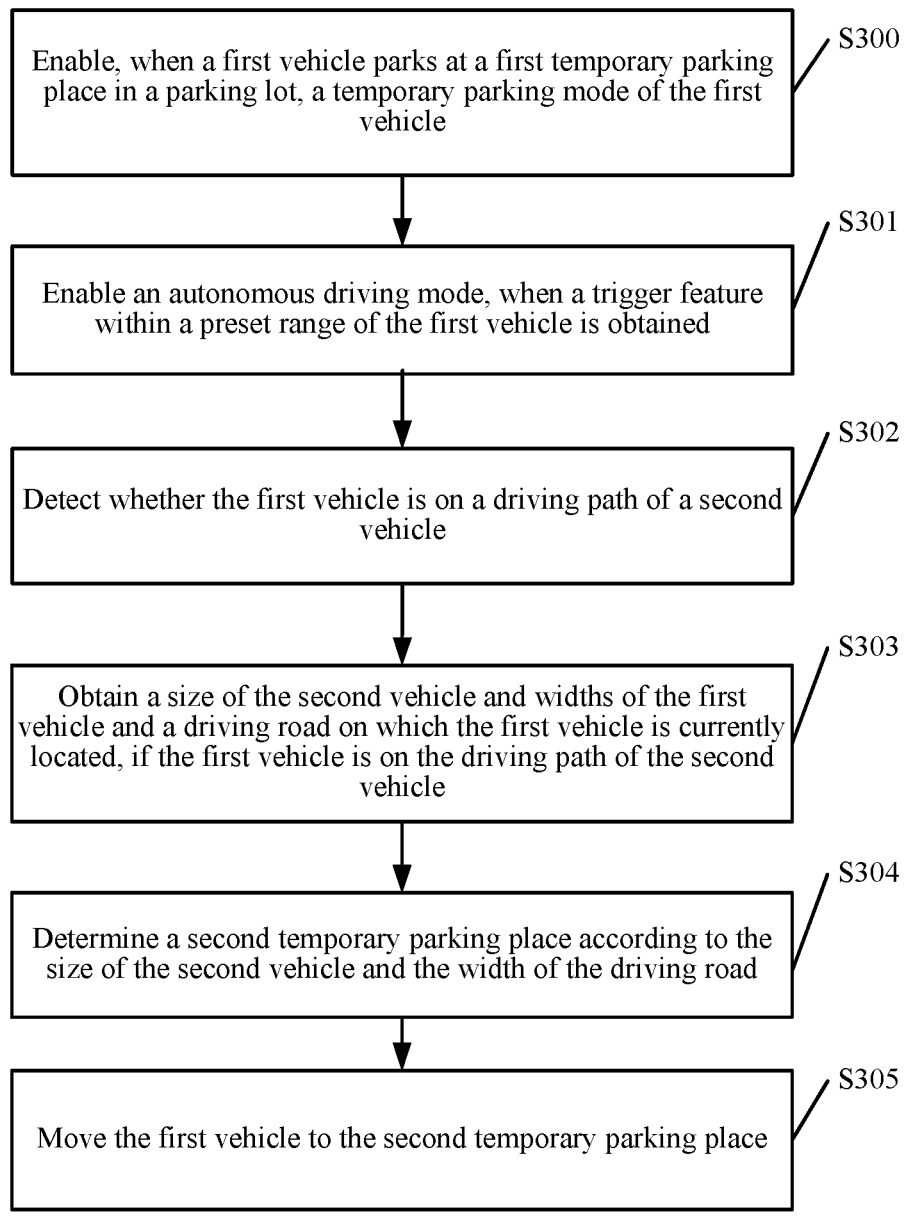
FIG. 3 is a flowchart of still another vehicle control method according to an embodiment of this disclosure.

FIG. 3 is a flowchart of still another vehicle control method according to an embodiment of this disclosure. The method shown in FIG. 3 may be performed, for example, in a vehicle control apparatus 111. The method may include the following steps:

In step S300, a temporary parking mode of a first vehicle is enabled when the first vehicle parks at a first temporary parking place in a parking lot. In the temporary parking mode, an engine of the first vehicle can be in a sleep mode, and a detection sensor of the first vehicle can be in an enabled mode.

In step S301, an autonomous driving mode of the first vehicle is enabled, when a trigger feature within a preset range of the first vehicle is obtained by using the detection sensor.

For an exemplary description of steps S300 to S301 in this embodiment of this disclosure, refer to steps S100 to S101 in the embodiment of FIG. 1B, and details are not described herein again.

In step S302, detection of whether the first vehicle is on a driving path of the second vehicle is performed.

When parking at the first temporary parking place, the first vehicle may enable the detection sensor at a fixed time to detect whether there is the trigger feature in a current environment. If there is the startup feature of the second vehicle in the current environment, the autonomous driving mode of the first vehicle is controlled to be enabled. It should be noted that, the startup feature may be obtained by using a sound detection sensor. For example, when the sound detection sensor captures a sound feature of startup of a motor vehicle, it is determined that there is the startup feature of the second vehicle in the current environment. In addition, the startup feature may alternatively be obtained by detecting energy by using an infrared sensor.

If the trigger feature existing in the current environment is the running feature of the second vehicle that is approaching the first vehicle, the autonomous driving mode of the first vehicle is controlled to be enabled. It should be noted that, a camera or radar of the first vehicle may be used to detect whether the distance between the second vehicle and the first vehicle is decreasing.

Based on the autonomous driving mode of the first vehicle, it is determined whether the first vehicle is on the driving path of the second vehicle. Specifically, the first vehicle may capture an image of the current environment by using the camera, analyze the image of the environment, and determine whether there is the second vehicle. Further, the first vehicle detect, by using the radar, whether a width of a road around the first vehicle is sufficient for the second vehicle to pass, and if the width of the road is not sufficient for the second vehicle to pass, determine that the first vehicle is on the driving path of the second vehicle.

In step S303, a size of the second vehicle and widths of the first vehicle and a driving road on which the first vehicle is currently located are obtained, if the first vehicle is on the driving path of the second vehicle.

If the first vehicle is on the driving path of the second vehicle, the first vehicle may determine the size of the second vehicle according to an image of the second vehicle that is captured by using the camera. In addition, the first vehicle may determine, by using the radar or the camera, the width of the driving road on which the first vehicle is currently located.

In step S304, a second temporary parking place is determined according to the size of the second vehicle and the width of the driving road, so that the first vehicle does not block the second vehicle from passing through the driving road when being parked at the second temporary parking place.

In step S305, the first vehicle moves to the second temporary parking place.

The first vehicle may determine the second temporary parking place according to the size of the second vehicle and the width of the current driving road. For example, the width of the current driving road is 8 meters, and the width of the second vehicle is 5 meters. To ensure passing of the second vehicle, the second temporary parking place that may be selected by the first vehicle should at least occupy a width less than or equal to 2.5 meters of the driving road, because a spacing of at least 0.5 meter needs to be reserved for ease of passing of the second vehicle.

Based on the autonomous driving mode of the first vehicle, the first vehicle moves from the first temporary parking place to the second temporary parking place.

According to the method shown in FIG. 3, a vehicle can autonomously switch between a temporary parking mode and an autonomous driving mode, so that not only movement of the vehicle can be autonomously controlled, but also power consumption can be reduced.

Figure 4:
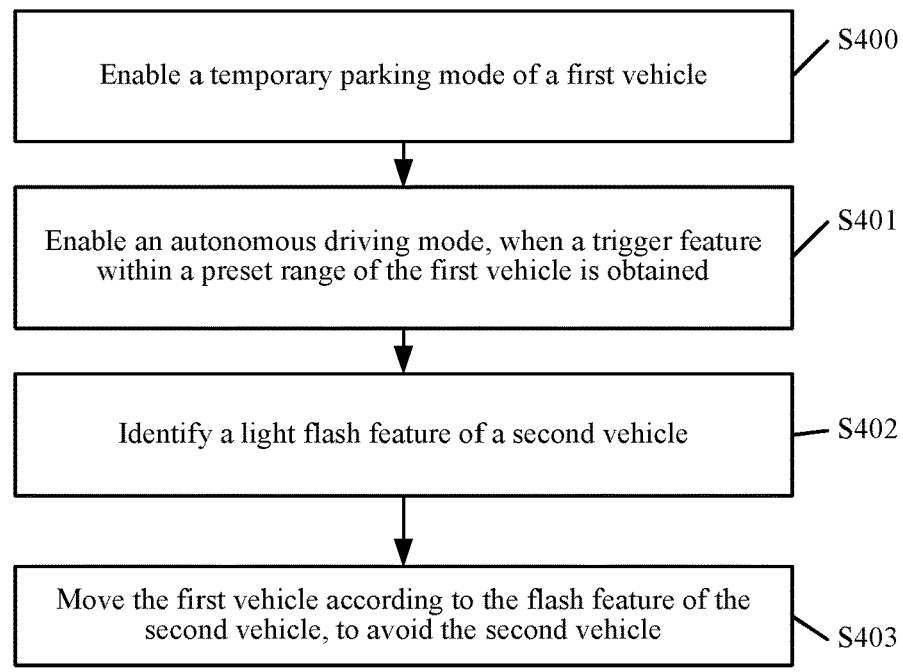
FIG. 4 is a flowchart of still another vehicle control method according to an embodiment of this disclosure.

FIG. 4 is a flowchart of still another vehicle control method according to an embodiment of this disclosure. The method shown in FIG. 4 may be performed, for example, in a vehicle control apparatus 111. The method may include the following steps:

In step S400, a temporary parking mode of a first vehicle is enabled. In the temporary parking mode, an engine of the first vehicle can be in a sleep mode, and a detection sensor of the first vehicle can be in an enabled mode.

In step S401, an autonomous driving mode of the first vehicle is enabled, when a trigger feature within a preset range of the first vehicle is detected by using the detection sensor.

For an exemplary description of steps S400 to S401 in this embodiment of this disclosure, refer to steps S100 to S101 in the embodiment of FIG. 1B, and details are not described herein again.

In step S402, a light flash feature of a second vehicle is identified, for example, based on the autonomous driving mode of the first vehicle. Further, an engine may be activated based on the autonomous driving mode of the first vehicle.

In step S403, the first vehicle moves according to the light flash feature of the second vehicle, to avoid the second vehicle.

For example, when it is detected that the trigger feature in the current environment includes the flash feature of the second vehicle, the first vehicle controls and enables the autonomous driving mode. It should be noted that, the flash feature of the second vehicle may be detected by a camera of the first vehicle. For example, the camera captures an image of the preset range, analyzes the image, and determines whether there is the flash feature of the second vehicle.

The flash feature of the second vehicle may indicate that the second vehicle needs to pass by the first vehicle, and then the first vehicle autonomously identifies the flash feature and moves according to the flash feature. For example, the flash feature indicates that the second vehicle needs to turn right, and then the first vehicle may measure a width of a driving road on the right and determine whether the width is sufficient for the second vehicle to turn right and pass by the first vehicle.

Figure 5:
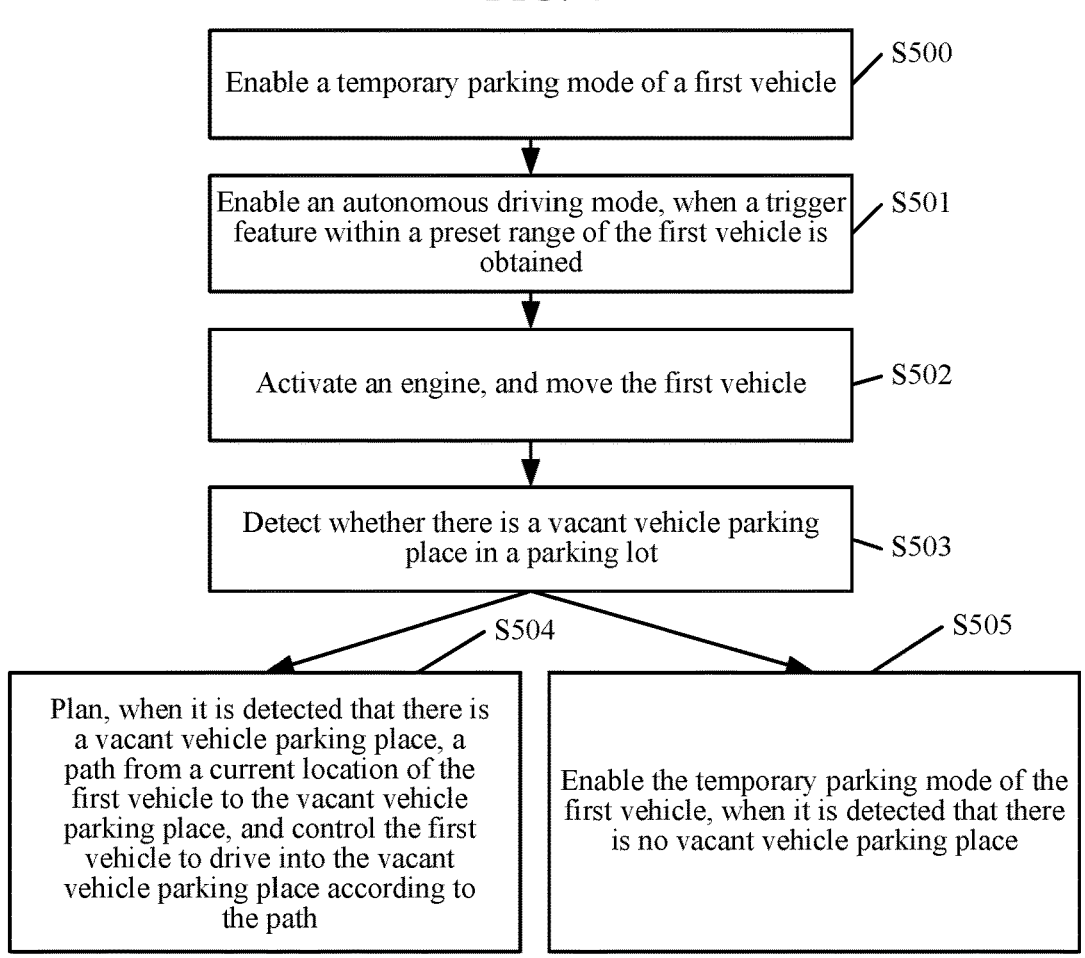
FIG. 5 is a flowchart of still another vehicle control method according to an embodiment of this disclosure.

FIG. 5 is a schematic flowchart of still another vehicle control method according to an embodiment of this disclosure. The method shown in FIG. 5 may be performed, for example, in a vehicle control apparatus 111. As shown in FIG. 5, the vehicle control method provided in this embodiment of this disclosure includes the following steps:

In step S500, a temporary parking mode of a first vehicle is enabled, in the temporary parking mode, an engine of the first vehicle being in a sleep mode, and a detection sensor of the first vehicle being in an enabled mode, to detect whether there is a trigger feature within a preset range of the first vehicle.

In step S501, an autonomous driving mode of the first vehicle is enabled, when the trigger feature within the preset range of the first vehicle is obtained.

In step S502, the engine is activated and the first vehicle moves in the autonomous driving mode.

For an exemplary description of steps S500 to S502 in this embodiment of this disclosure, refer to steps S100 to S102 in the embodiment of FIG. 1B, and details are not described herein again.

In step S503, detection of whether there is a vacant vehicle parking space (or place) in a parking lot is performed based on the autonomous driving mode of the first vehicle.

For example, when the first vehicle is in the autonomous driving mode, the first vehicle may further detect whether there is a vacant vehicle parking space in the parking lot. For example, the first vehicle may capture an image of a current environment by using a camera, analyze the image, and determine whether there is a feature of a vacant vehicle parking space in the current environment. If there is the feature of the vacant vehicle parking space, it is determined that there is the vacant vehicle parking space.

It should be noted that, the first vehicle may scan, by using an autonomous driving system, an environment nearby while driving, to determine whether there is a vacant vehicle parking space.

In step S504, a path from a current location of the first vehicle to the vacant vehicle parking place is planned, if there is a vacant vehicle parking space, and the first vehicle is controlled to drive into the vacant vehicle parking space according to the path.

Accordingly, in one embodiment of this application, if it is detected that there is a vacant vehicle parking space, the autonomous driving system may plan the path from the current location of the first vehicle to the vacant vehicle parking space. In an embodiment, the first vehicle may send an identifier of the vacant vehicle parking space and the location of the first vehicle to the server 120, and the server 120 plans the path from the first vehicle to the vacant vehicle parking space. After obtaining the path from the current location of the first vehicle to the vacant vehicle parking space, the first vehicle may drive into the vacant vehicle parking space according to the path.

After the first vehicle drives into the vacant vehicle parking space, the autonomous driving system sends a location of the vacant vehicle parking space to a target user. The target user may be a driver of the first vehicle, for example, with a mobile terminal. The location information can be sent to the mobile terminal. In this way, it is convenient for the driver to learn of a specific location of the first vehicle.

After the first vehicle parks at the vacant vehicle parking space, the autonomous driving system and all detection sensors of the first vehicle are disabled in one example.

In step S505, the temporary parking mode of the first vehicle is enabled if there is no vacant vehicle parking space.

When the first vehicle detects that there is still no vacant vehicle parking place, in one embodiment, the first vehicle switches again from the autonomous driving mode to the temporary parking mode, that is, re-enables the temporary parking mode of the first vehicle, and enables the detection sensors of the first vehicle to continue to detect whether there is the trigger feature in the current environment.

Figure 6:
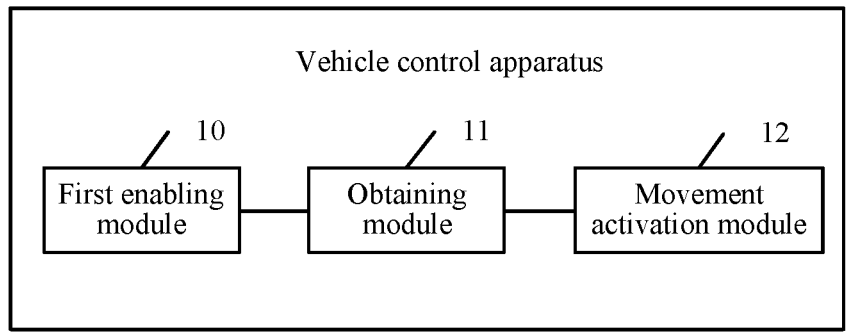
FIG. 6 is a schematic structural diagram of a vehicle control apparatus according to an embodiment of this disclosure.

FIG. 6 is a schematic structural diagram of a vehicle control apparatus according to an embodiment of this disclosure. As shown in the figure, the vehicle control apparatus in this embodiment of this disclosure can include a first enabling module 10, an obtaining module 11, and a movement activation module 12.

The first enabling module 10 is configured to enable a temporary parking mode of a first vehicle. In the temporary parking mode, an engine of the first vehicle can be in a sleep mode, and a detection sensor of the first vehicle can be in an enabled mode.

The first obtaining module 11 is configured to obtain a trigger feature within a preset range of the first vehicle. The trigger feature can be used for triggering the first vehicle to enable an autonomous driving mode of the first vehicle. The trigger feature can include at least one of the following features: a startup feature of a second vehicle within the preset range, a running feature of the second vehicle that is approaching the first vehicle within the preset range, and a flash feature of the second vehicle within the preset range.

It should be noted that, the second vehicle in this embodiment of this disclosure is any vehicle other than the first vehicle.

The movement activation module 12 is configured to activate the engine, and move the first vehicle in the autonomous driving mode.

Figure 7A:
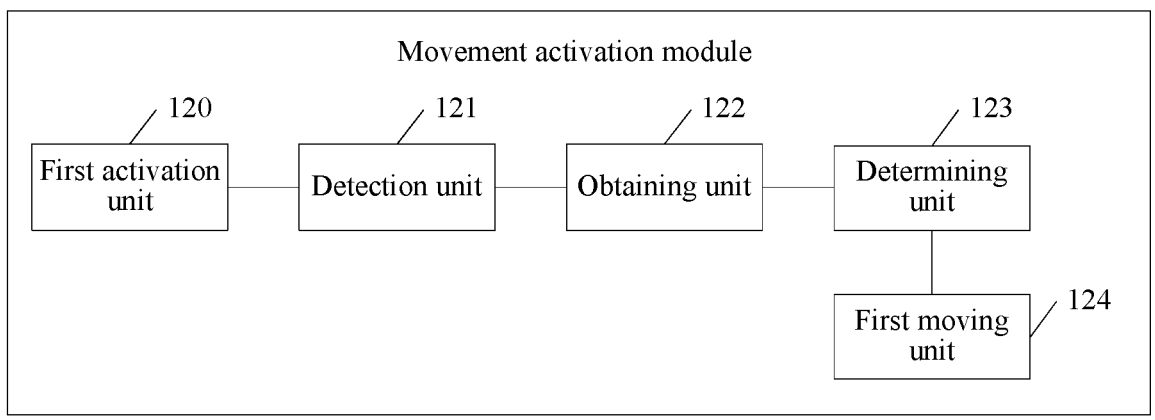
FIG. 7a is a schematic structural diagram of a movement activation module according to an embodiment of this disclosure.

If the trigger feature includes the startup feature of the second vehicle, or the trigger feature includes the running feature of the second vehicle that is approaching the first vehicle, as shown in FIG. 7a, the movement activation module 12 includes a first activation unit 120, a detection unit 121, an obtaining unit 122, a determining unit 123, and a first moving unit 124.

The first activation unit 120 is configured to activate the engine.

The detection unit 121 is configured to detect whether the first vehicle is on a driving path of the second vehicle based on the autonomous driving mode of the first vehicle.

The obtaining unit 122 is configured to obtain a size of the second vehicle and widths of the first vehicle and a driving road on which the first vehicle is currently located, if the first vehicle is on the driving path of the second vehicle.

The determining unit 123 is configured to determine a second temporary parking place according to the size of the second vehicle and the width of the driving road, so that the first vehicle does not block the second vehicle from passing through the driving road when being parked at the second temporary parking place.

The first moving unit 124 is configured to move the first vehicle to the second temporary parking place.

Figure 7B:
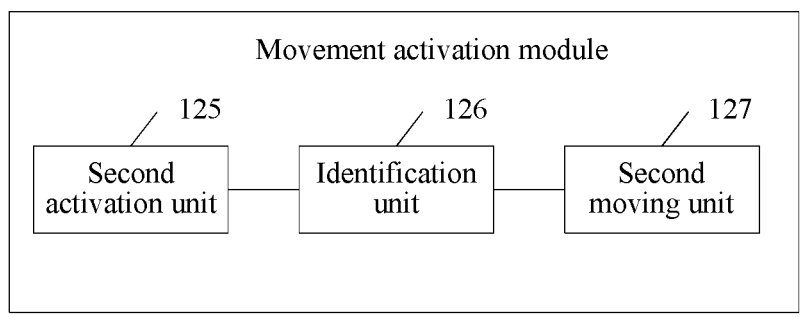
FIG. 7b is a schematic structural diagram of another movement activation module according to an embodiment of this disclosure.

If the trigger feature includes the flash feature of the second vehicle, as shown in FIG. 7b, the movement activation module includes a second activation unit 125, an identification unit 126, and a second moving unit 127.

The second activation unit 125 is configured to activate the engine.

The identification unit 126 is configured to identify the flash feature of the second vehicle based on the autonomous driving mode of the first vehicle.

The second moving unit 127 is configured to move the first vehicle according to the flash feature of the second vehicle, to avoid the second vehicle.

Figure 8:
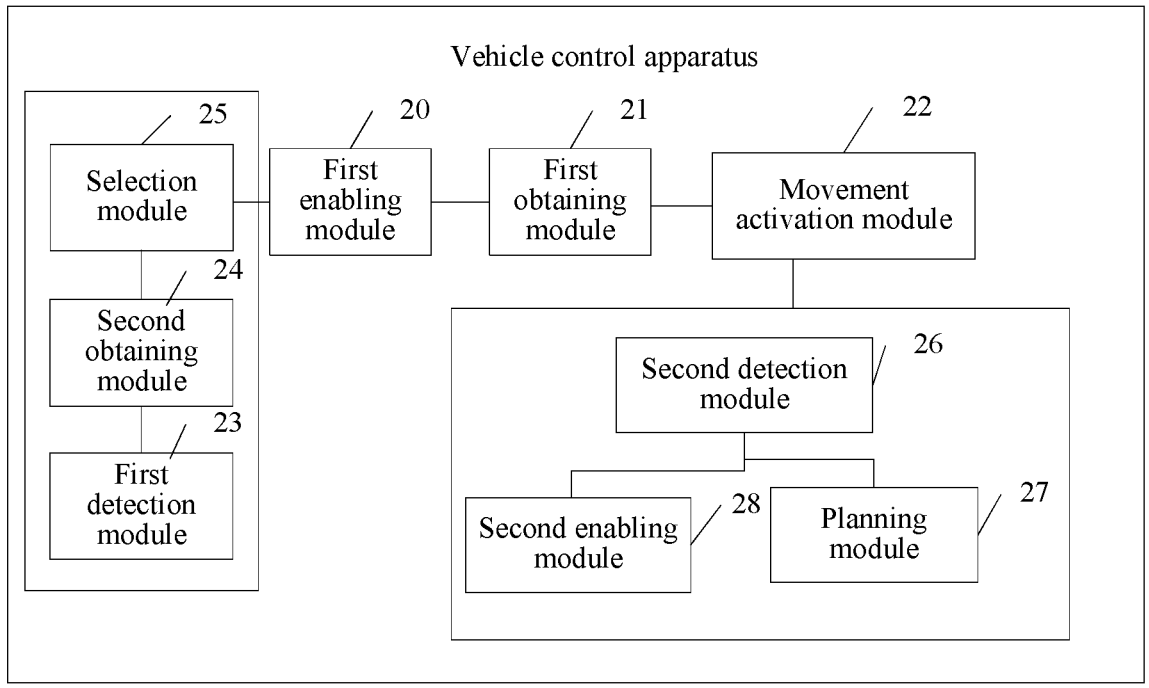
FIG. 8 is a schematic structural diagram of another vehicle control apparatus according to an embodiment of this disclosure.

FIG. 8 is a schematic structural diagram of another vehicle control apparatus according to an embodiment of this disclosure. As shown in the figure, the vehicle control apparatus in this embodiment of this disclosure includes a first enabling module 20, a first obtaining module 21, and a movement activation module 22.

As shown in FIG. 8, the vehicle control apparatus in this embodiment of this disclosure may further include a first detection module 23, a second obtaining module 24, and a selection module 25.

The first detection module 23 is configured to detect, when a first vehicle arrives at a parking lot, whether there is a vacant vehicle parking space (or place) in the parking lot.

The second obtaining module 24 is configured to obtain vacant places in the parking lot, if there is no vacant vehicle parking space in the parking lot.

The selection module 25 is configured to select, according to a size of the first vehicle, a first temporary parking place from the vacant places for parking.

As shown in FIG. 8, the vehicle control apparatus in this embodiment of this disclosure may further include a second detection module 26, a planning module 27, and a second enabling module 28.

The second detection module 26 is configured to detect whether there is a vacant vehicle parking space in the parking lot based on the autonomous driving mode of the first vehicle.

The planning module 27 is configured to: plan, if there is a vacant vehicle parking space, a path from a current location of the first vehicle to the vacant vehicle parking space; and control the first vehicle to drive into the vacant vehicle parking space according to the path.

The second enabling module 28 is configured to enable the temporary parking mode of the first vehicle, if there is no vacant vehicle parking space.

Figure 9:
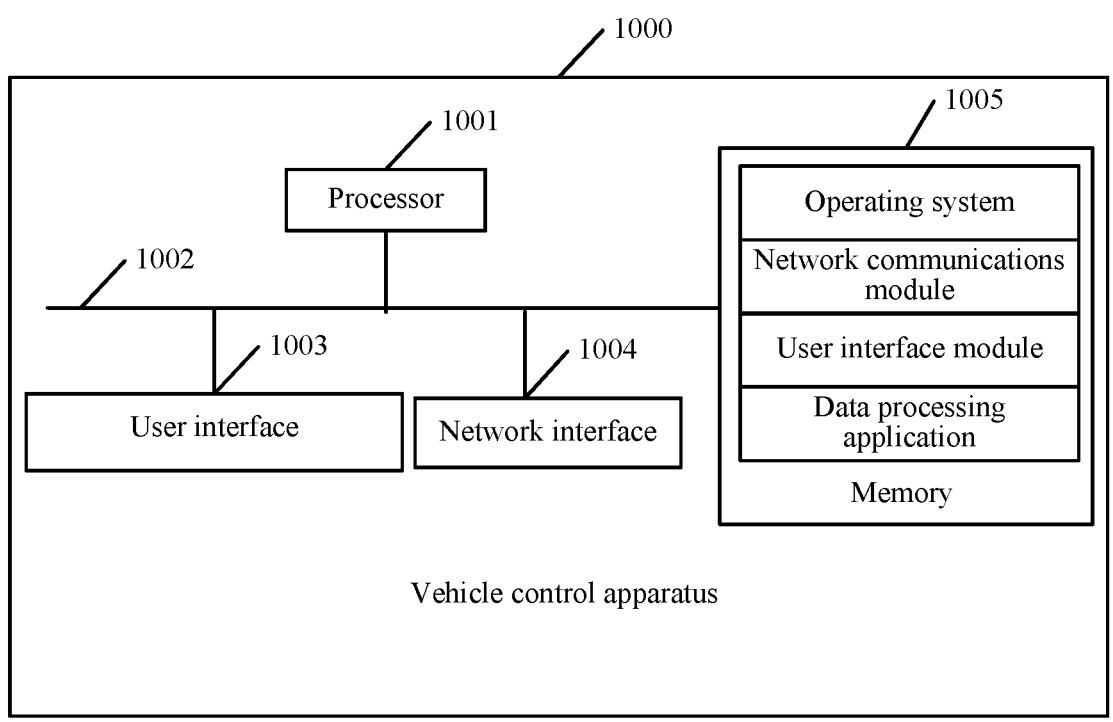
FIG. 9 is a schematic structural diagram of still another vehicle control apparatus according to an embodiment of this disclosure.

FIG. 9 is a schematic structural diagram of still another vehicle control apparatus according to an embodiment of this disclosure. As shown in FIG. 9, the vehicle control apparatus 1000 may include processing circuitry, such as a processor 1001 (e.g., a CPU), at least one network interface 1004, a user interface 1003, a memory 1005, and at least one communications bus 1002. The communications bus 1002 is configured to implement connection communication between the components. A user may invoke the user interface 1003 to implement communication with the vehicle control apparatus, and optionally, the user interface 1003 may include a key, a touchscreen, and the like.

Optionally, the network interface 1004 may include a standard wired interface and a standard wireless interface (such as a Wi-Fi interface). The memory 1005 may be a non-transitory memory, such as a high-speed RAM memory, a non-volatile memory, or a magnetic disk memory. The memory 1005 may further include one storage apparatus that is located far away from the processor 1001. As shown in FIG. 8, the memory 1005, as a computer storage medium, may include an operating system, a network communications module, a user interface module, and a data processing application.

In the vehicle control apparatus 1000 shown in FIG. 9, the processor 1001 may be configured to invoke the data processing application stored in the memory 1005, and specifically perform, for example, the following operations:

enabling a temporary parking mode of a first vehicle, in the temporary parking mode, an engine of the first vehicle being in a sleep mode, and a detection sensor of the first vehicle being in an enabled mode, to detect whether there is a trigger feature within a preset range of the first vehicle;

enabling an autonomous driving mode of the first vehicle, when the trigger feature within the preset range of the first vehicle is obtained; and activating the engine and moving the first vehicle in the autonomous driving mode.

Before the execution of enabling a temporary parking mode of a first vehicle, the processor 1001 may further perform the following operations:

detecting, when the first vehicle arrives at a parking lot, whether there is a vacant vehicle parking space (or place) in the parking lot;

obtaining vacant places in the parking lot, if there is no vacant vehicle parking space in the parking lot; and selecting, according to a size of the first vehicle, a first temporary parking place from the vacant places for parking.

The trigger feature includes at least one of the following features:

a startup feature of a second vehicle within the preset range;

a running feature of the second vehicle that is approaching the first vehicle within the preset range; and a flash feature of the second vehicle within the preset range.

The execution of moving the first vehicle in the autonomous driving mode may include:

detecting whether the first vehicle is on a driving path of a second vehicle based on the autonomous driving mode of the first vehicle;

obtaining a size of the second vehicle and widths of the first vehicle and a driving road on which the first vehicle is currently located, if the first vehicle is on the driving path of the second vehicle;

determining a second temporary parking place according to the size of the second vehicle and the width of the driving road, so that the first vehicle does not block the second vehicle from passing through the driving road when being parked at the second temporary parking place; and moving the first vehicle to the second temporary parking place.

If the trigger feature includes the flash feature of the second vehicle, the moving the first vehicle in the autonomous driving mode may specifically include:

identifying the flash feature of the second vehicle based on the autonomous driving mode of the first vehicle; and moving the first vehicle according to the flash feature of the second vehicle, to avoid the second vehicle.

After the execution of enabling an autonomous driving mode of the first vehicle, the vehicle control apparatus 1000 may further perform the following operations:

detecting whether there is a vacant vehicle parking space in the parking lot based on the autonomous driving mode of the first vehicle; and planning, if there is a vacant vehicle parking space, a path from a current location of the first vehicle to the vacant vehicle parking space; and controlling the first vehicle to drive into the vacant vehicle parking space according to the path; or enabling the temporary parking mode of the first vehicle, if there is no vacant vehicle parking space.

Although aspects of the disclosure are described with reference to specific features and embodiments thereof that are proposed as examples, various modifications and combinations may be made to these examples without departing from the spirit and scope of this disclosure. Correspondingly, this specification and the accompanying drawings are merely used as exemplary descriptions of this disclosure defined by the appended claims, and are considered as having covered any of and all of modifications, variations, combinations, or equivalents within the scope of this disclosure. A person skilled in the art can make various modifications and variations to this disclosure without departing from the spirit and scope of this disclosure. In this case, if the modifications and variations made to this disclosure fall within the scope of the claims of this disclosure and their equivalent technologies, this disclosure is intended to include these modifications and variations.

What is claimed is:

1. A method, comprising:
    operating a first vehicle in a temporary parking mode while the first vehicle is parked at a first temporary parking location, a first detection sensor of the first vehicle being in an enabled mode when the first vehicle is operating in the temporary parking mode;
    while operating in the temporary parking mode, in response to a person being detected, outputting, by the first vehicle, a notification to inform the person that the first vehicle is capable of moving away autonomously to avoid blocking a driving path of a vehicle;
    while operating in the temporary parking mode, detecting, by the first vehicle, a trigger feature based on the first detection sensor, the trigger feature indicating occurrence of an event associated with a second vehicle or a human located within a preset range of the first vehicle; and
    entering an autonomous driving mode from the temporary parking mode, by the first vehicle, and autonomously moving the first vehicle to a second parking location in response to the detected trigger feature.

2. The method according to claim 1, further comprising:
    changing an active mode of an engine of the first vehicle to a sleep mode to enter the temporary parking mode.

3. The method according to claim 1, further comprising:
    detecting, when the first vehicle arrives at a parking area, whether there is a vacant vehicle parking space in the parking area;
    obtaining vacant places in the parking area, when no vacant vehicle parking space is detected in the parking area; and
    selecting, according to a size of the first vehicle, the first temporary parking location from the vacant places.

4. The method according to claim 1, wherein the trigger feature is at least one of:
    a startup of the second vehicle within the preset range;

movement of the second vehicle that is approaching the first vehicle within the preset range; or a flashing light of the second vehicle within the preset range.

5. The method according to claim 1, further comprising:
determining whether the first vehicle is on a driving path of the second vehicle; and
determining the second parking location based on a size of the second vehicle, a width of the first vehicle, and a width of the driving path.

6. The method according to claim 1, further comprising:
predicting a movement path of the second vehicle according to a flashing light of the second vehicle, the flashing light corresponding to a turn signal of the second vehicle,
wherein the moving the first vehicle includes moving the first vehicle according to the movement path to avoid the second vehicle.

7. The method according to claim 1, further comprising:
detecting whether there is a vacant vehicle parking space in a parking area;
when the vacant vehicle parking space is detected,
planning a path from a current location of the first vehicle to the vacant vehicle parking space, and
moving the first vehicle to the vacant vehicle parking space according to the path; and
when no vacant vehicle parking space is detected,
re-entering the temporary parking mode of the first vehicle.

8. The method according to claim 7, wherein the detecting whether there is the vacant vehicle parking space in the parking area comprises:
capturing an image of a current environment of the first vehicle; and
determining whether there is a feature of the vacant vehicle parking space in the current environment based on the captured image.

9. The method according to claim 8, wherein the detecting whether there is the vacant vehicle parking place in the parking area further comprises:
detecting whether there is an obstacle in the vacant vehicle parking space, when the feature of the vacant vehicle parking place is determined to be in the current environment.

10. The method according to claim 7, wherein the detecting whether there is the vacant vehicle parking space in the parking area comprises:
determining whether a vehicle has left the parking area based on an image of an exit of the parking area.

11. The method according to claim 7, wherein the planning the path from the current location of the first vehicle to the vacant vehicle parking space comprises:
sending an identifier of the vacant vehicle parking space and the current location of the first vehicle to a server, so that the server plans the path from the first vehicle to the vacant vehicle parking space; and
receiving the path from the server.

12. The method according to claim 1, further comprising:
capturing an image of a current environment of the first vehicle; and
determining whether the first vehicle blocks the driving path of the second vehicle based on the captured image.

13. The method according to claim 1, further comprising:
determining a width of a vacant space around the first vehicle; and
determining, according to a width of the second vehicle and the width of the vacant space around the first vehicle, whether the first vehicle blocks the driving path of the second vehicle.

14. The method according to claim 1, wherein the detecting the trigger feature comprises:
enabling a second detection sensor, when an object approaching the first vehicle is detected by using the first detection sensor; and
detecting movement or a biological feature of the object by using the second detection sensor.

15. The method according to claim 1, further comprising:
sending, when an abnormal condition in the first vehicle is detected, a notification message indicating the abnormal condition to a terminal device associated with the first vehicle.

16. An apparatus, comprising:
processing circuitry configured to
control a first vehicle to operate in a temporary parking mode while the first vehicle is parked at a first temporary parking location, a first detection sensor of the first vehicle being in an enabled mode when the first vehicle is operating in the temporary parking mode;
while the first vehicle is operating in the temporary parking mode, in response to a person being detected, output from the first vehicle a notification to inform the person that the first vehicle is capable of moving away autonomously to avoid blocking a driving path of a vehicle;
while the first vehicle is operating in the temporary parking mode, detect a trigger feature within a preset range of the first vehicle based on the first detection sensor, the trigger feature indicating occurrence of an event associated with a second vehicle or a human located within the preset range; and
cause the first vehicle to enter an autonomous driving mode from the temporary parking mode and autonomously move to a second parking location in response to the detected trigger feature.

17. The apparatus according to claim 16, wherein the trigger feature is at least one of:
a startup of the second vehicle within the preset range;
movement of the second vehicle that is approaching the first vehicle within the preset range; or
a flashing light of the second vehicle within the preset range.

18. A non-transitory computer-readable medium storing a program executable by a processor to perform a method, the method comprising:
operating a first vehicle in a temporary parking mode while the first vehicle is parked at a first temporary parking location, a first detection sensor of the first vehicle in an enabled mode when the first vehicle is operating in the temporary parking mode;
while operating in the temporary parking mode, in response to a person being detected, outputting, by the first vehicle, a notification to inform the person that the first vehicle is capable of moving away autonomously to avoid blocking a driving path of a vehicle;
while operating in the temporary parking mode, detecting, by the first vehicle, a trigger feature within a preset range of the first vehicle based on the first detection sensor, the trigger feature indicating occurrence of an event associated with a second vehicle or a human located within the preset range; and entering an autonomous driving mode from the temporary parking mode, by the first vehicle, and autonomously moving the first vehicle to a second parking location.

* * * * *